ROBERT A. KLEIST
CLARENCE S. JONES
INVENTORS

BY Richard G. Stephens
ATTORNEY

United States Patent Office 3,072,899

Patented Jan. 8, 1963

3,072,899

REMOTE INTERROGATOR-RESPONDER SIGNALLING SYSTEM COMMUNICATIONS CHANNEL APPARATUS

Robert A. Kleist, Sunnyvale, and Clarence S. Jones, Los Altos, Calif., assignors to General Precision, Inc., Binghamton, N.Y., a corporation of Delaware Filed Feb. 15, 1960, Ser. No. 8,748
3 Claims. (Cl. 343—6.5)

This invention relates to interrogator-responder signalling systems, and more particularly, to an improved means for handling response signals of such a system. Appl. Ser. No. 739,909, filed June 4, 1958, by Clarence S. Jones, discloses an improved interrogator-responder system capable of electronically transmitting data between an interrogator device and one or more responder devices, where relative motion may occur between the interrogator device and each responder, so that signals may be provided from the responder which uniquely identify the responder, and, or instead, indicate one or more conditions associated with the responder. One exemplary disclosed application of the prior invention is the use of passive responder devices on vehicles, such as railroad box cars, for the purpose of identifying each car as it passes along a track adjacent to which an interrogator unit is located. The interrogator unit, essentially a transmitter-modulator unit, supplies an interrogator signal to an interrogator power-inducing coil located near or under the railroad tracks. When a boxcar carrying a responder passes over the coil, operating voltage is induced in the responder, causing the responder to emit a response signal on a response frequency. A response pickup coil tuned to the response frequency picks up the response signal, which consists of a radio frequency of 100 kilocycles/second, for example, with a plurality of audio frequencies modulated thereon. Each individual responder is designed so as to use a unique and different set of audio frequencies in modulating its response carrier, so that detecting and decoding a response signal may serve to identify a responder. Apparatus of the abovedescribed type is marketed under the trademark "Tracer" by the assignee of this application.

In the vehicle identification application mentioned, the power level of the response signal is small, so that the response pickup coil must be located near the interrogator power-inducing coil in order to receive a strong response signal. In fact, in some applications it is desirable to use the same coil as both power-inducing coil and response pickup coil, with filtering provided to separate the two signal frequencies. It is usually desirable to transmit the information picked up by the response pickup coil to some remote central location, such as a dispatcher's office, which may be located a considerable distance from the trackside interrogator power-inducing coil site. This transmission is done most economically over voice grade communication circuit such as a telephone line, but since ordinary telephone lines would almost completely attenuate a radio frequency signal, the signal from the response pickup coil is demodulated and amplified at or near the trackside coil location, providing a signal comprising a group of audio tones, which an ordinary telephone line can handle adequately.

At the dispatcher's office, then, the composite audio signal must be accurately decoded, determining whether components of perhaps fifteen or twenty different audio frequencies are present or absent. Previously it has been proposed to do such decoding by means of audio bandpass filters, providing output voltages from each filter section where a frequency component is present. The output voltages are amplified and rectified, and then they may be seen to comprise a parallel digital signal, which may be processed in various ways in numerous different data processing apparatuses.

In prior apparatus, decoding has required accurate, stable and expensive filtering or frequency-selective amplification, with numerous bulky and complex filter networks. The present invention overcomes the prior art filtering problem by shifting the response signal frequencies, so that simple, high-Q crystal filters may be substituted for low frequency filters, additionally providing a system having a greater speed of response greater accuracy and a savings in weight, size and expense.

It is therefore a primary object of the present invention to provide an improved interrogator-responder signalling system utilizing improved frequency separation apparatus, thereby increasing system speed of response, increasing system accuracy, and lowering system cost.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 4:
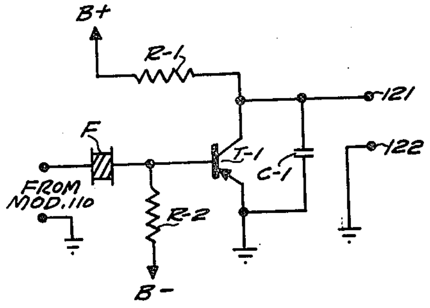
Figure 3A:
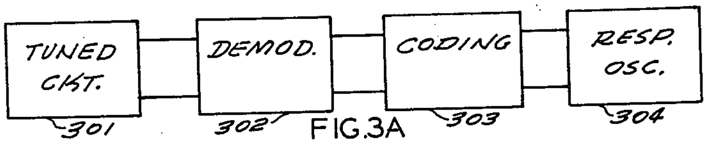
Figure 3B:
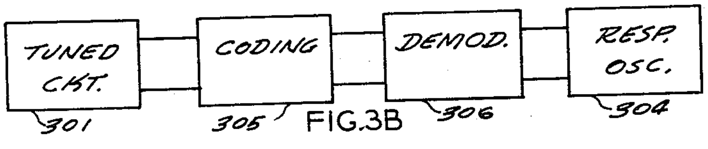

FIGS. 3*a* and 3*b* each are block diagrams useful in understanding the operation of two alternative responder devices which may be used in conjunction with the invention; and FIG. 4 shows exemplary filter and detector circuits which may be used with the invention.

Figure 1:
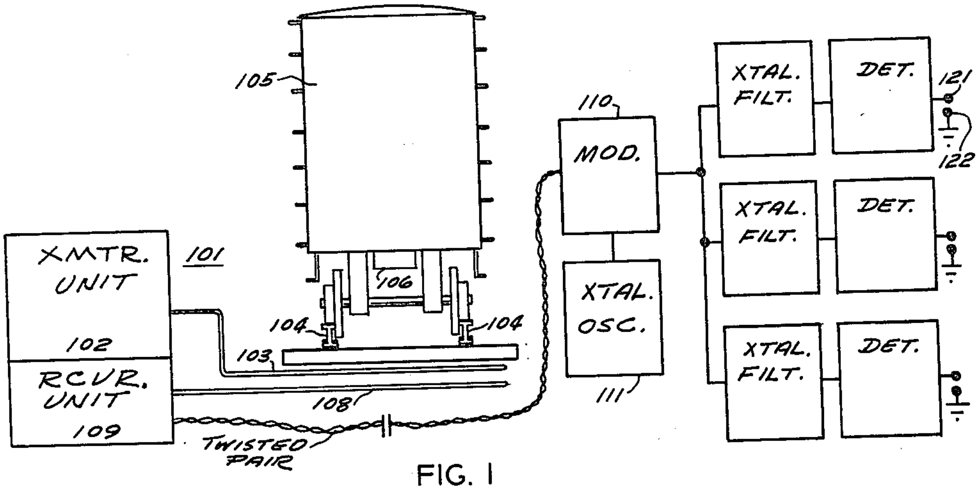
FIG. 1 is a schematic diagram partially in block form illustrating an exemplary embodiment of the invention.
Figure 2:
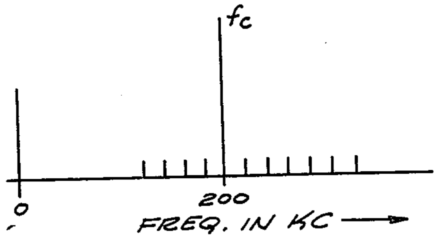
FIG. 2 is a graphical illustration of one form of interrogator signal which may be used with the present invention.

In FIG. 1 an interrogator unit 101 comprising a transmitter unit 102 and interrogator power-inducing coil 103 are shown, with coil 103 located near the tracks 104, 104 of a railroad. Transmitter unit 102 provides a modulated high frequency signal of the type graphically illustrated in FIG. 2 as consisting of a 200 kilocycle/second carrier and ten separate and discrete sidebands, six shown as being higher in frequency than the carrier and four shown as being lower in frequency than the carrier. The signal illustrated in FIG. 2 is a special type of single sideband signal, in that although each sideband shown has a different spacing from the carrier, as is the case with usual single sideband signals, sidebands lie on both sides of the carrier, which is unlike usual single sideband systems. No pair of sidebands in FIG. 2 is symmetrically located about the carrier, however. A special single sideband transmitter system capable of transmitting signals such as shown in FIG. 2 is shown in detail and claimed in copending Appl. Ser. No. 15,597 filed on even date herewith by Robert A. Kleist for "Signalling System," now U.S. Patent No. 3,036,295, issued May 22, 1962, which application has been assigned to the same assignee as the instant invention.

Attached to a vehicle shown as comprising railroad boxcar 105 is a small responder device 106, sometimes called a response block. A typical embodiment of responder is about 4 x 4 x 1 inches, comprising a low-loss epoxy encapsulated or polystyrene foam encapsulated electrical circuit having no internal power source or external power source wired to the responder. Two alternative responder circuit arrangements are illustrated in block form in FIGS. 3*a* and 3*b*. In FIG. 3*a* a radio frequency tuned circuit tuned to receive the carrier and all ten sidebands of FIG. 2 is excited whenever responder 106 approaches power-inducing coil 103. The voltage developed across tuned circuit 301 is applied to a demodulator 302, which detects the voltage, providing a first composite voltage having a direct or continuous voltage component from rectification of the carrier, superimposed on ten low frequency or audio frequencies corresponding in frequency to the frequency differences between the carrier $f_c$ and each of the sideband frequencies of FIG. 2. This first composite voltage is applied to a coding network 303, which selectively passes or selectively traps out certain of the audio frequencies in accordance with the indentity or other condition of the responder, providing a coded composite voltage, which is applied to operate a semi-conductor response oscillator 304. Being superimposed upon the direct voltage used to power response oscillator 304, those audio frequencies not trapped out by coding network 303 become modulated on the response oscillator carrier and appear in the response signal. The circuit of FIG. 3*a* may be used with double sideband interrogator signals as well as with single sideband signals.

The alternative responder circuit shown in FIG. 3*b* also includes a tuned circuit 301 tuned to receive the carrier and all ten sidebands of the interrogator signal, building up a voltage as the responder approaches power-inducing coil 103. Radio frequency coding networks, such as crystal filters, represented by block 305 in FIG. 3*b* are connected to tuned circuit 301 to eliminate selectively one or more of the sidebands to code the radio frequency signal. The coded signal is demodulated in demodulator 306 to provide a composite voltage having direct voltage component and audio frequencies corresponding to the differences between the carrier frequency and each of the sidebands not eliminated by coding network 305. This composite voltage operates response oscillator 304 to provide a response signal. The response block circuit of FIG. 3*b* is usually used with single sideband interrogator signals in order to trap out a sideband completely with a single radio frequency crystal filter.

With either version of responder, the power induced in a responder becomes neglible whenever the responder is located a long distance from an interrogator coil. As a responder approaches an interrogator coil, voltage must build up in the responder to a certain value before the response oscillator will oscillate, and even after it begins oscillating, response oscillator output power increases as more power is induced into the response block. The response signal builds up to a maximum when the responder is directly over or at its greatest proximity to the interrogator coil, and then decreases as the responder continues past the coil and recedes in the other direction.

While responder 106 is transmitting its coded response signal, the signal is picked up by response pickup coil 108 located near interrogator coil 103. The response signal induced in pickup coil 108 comprises a response carrier with a selected group of low or audio frequency signals modulated thereon. The signal from coil 108 is amplified and immediately demodulated by conventional amplifiers and demodulators in a receiver unit shown in block form at 109, thereby to provide a complex voltage comprising a plurality of audio frequencies, with one or more of the ten possible audio frequencies excluded in order to code the signal. As mentioned above, the detection and demodulation of the radio frequency response signal is necessary in order to transmit it without unreasonable attenuation over a communications facility, shown as comprising a conventional twisted pair telephone line.

The complex audio signal sent over the telephone line heretofore has been filtered directly with audio filters. In accordance with the present invention the signal is instead applied to modulator 110, which is also supplied with a radio frequency secondary carrier $f_{c2}$ from a stable frequency source shown in block 111 as comprising a conventional crystal-controlled oscillator. The secondary carrier $f_{c2}$, which may, but need not be the same frequency as the interrogator carrier $f_c$, is modulated in accordance with the audio frequencies transmitted over the telephone line, thereby providing a high frequency double side band signal except that one or more pairs of sidebands will be missing due to coding effected by the responder coding network. The high frequency modulated signal from modulator 110 is applied to a group of selective crystal filters and detectors, only three being shown in block form in FIG. 1, but at least ten being provided for a ten digit coding system. The frequency selective filter and detector for each channel may comprise, for example, the simple circuit of FIG. 4.

The radio frequency voltages from modulator 110 are applied through crystals such as F, each of which are designed to be series resonant at one frequency of each of their associated sideband pairs. Resistors R–1 and R–2 bias transistor T–1 to keep its base electrode near ground potential. The particular sideband signal passing through the low series-resonance impedance of crystal F is applied between the base and emitter of transistor T–1. Transistor T–1 and capacitor C–1 demodulate the radio frequency sideband, providing an output signal at terminal 121 indicating the presence of a particular sideband. It will be seen that collectively the output terminals of all the detectors provide a parallel digital signal coded in accordance with the identity or other condition associated with the particular response block present at the time within the interrogating-responding zone.

Since high frequency filters are used, the speed of response of the system is considerably enhanced, as RF filters have much shorter time constants than audio filters. Furthermore, since filtering is done at a high frequency level in the present invention rather than at a low frequency level, conventional radio frequency crystal filters may be used. Such filters have far higher "Q's" than can reasonably be obtained with audio filters, and hence filtering may be done more accurately and sharply, and system bandwith may be narrowed by spacing sidebands closer together. Narrowing system bandwith increases system power efficiency, as it enables tuned circuits to be made more selective.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. An interrogator-responder signalling system, comprising in combination: an interrogator unit for providing an interrogator signal comprising an interrogator carrier having a first group of discrete sideband frequencies each differing in frequency from said interrogator carrier by a respective one of a first group of frequencies; a plurality of responder devices, each of said responder devices being capable of motion relative to said interrogator unit and operable upon approach to said interrogator within a certain distance to provide a coded response signal comprising a response carrier having a second group of discrete sideband frequencies each differing in frequency from said response carrier by one of said frequencies of said first group of frequencies; a response receiver unit located within said certain distance from said interrogator, tuned to receive said response signal and operative to demodulate said response signal to provide complex wave containing components of certain of said first group of frequencies; a communications channel connected to carry said complex wave to a remote location; a secondary carrier frequency oscillator located at said remote location and operative to provide a secondary carrier; a modulator circuit connected to said communications channel and said secondary carrier frequency oscillator and operative to modulate said secondary carrier with said complex wave to provide a secondary modulated signal having at least one different sideband for each of said components of said complex wave; and a plurality of frequency selective detector means corresponding in number to said first group of frequencies located at said remote location and connected to receive said secondary modulated signal, each of said detector means being arranged to select and detect a different sideband component of said secondary modulated signal, thereby to provide collectively a parallel digital coded signal.

2. Apparatus according to claim 1 in which each of said frequency selective detector means includes a crystal filter designed to be series-resonant at one of said secondary modulated signal sideband frequencies, said filter being connected in series between said secondary radio frequency modulated signal and a detector.

3. Apparatus according to claim 1 in which certain of said second group of sideband frequencies are symmetrically spaced in frequency above and below said response carrier, and in which said modulator circuit is a double sideband modulator, thereby providing a secondary modulated signal having a different pair of sidebands for each of said components of said complex wave, each of said frequency selective detector means being arranged to select and detect only one of each pair of sidebands.

References Cited in the file of this patent

UNITED STATES PATENTS

| | | |
|---|---|---|
| 2,828,480 | Golladay | Mar. 25, 1958 |
| 2,910,579 | Jones et al. | Oct. 27, 1959 |